Figure 1:
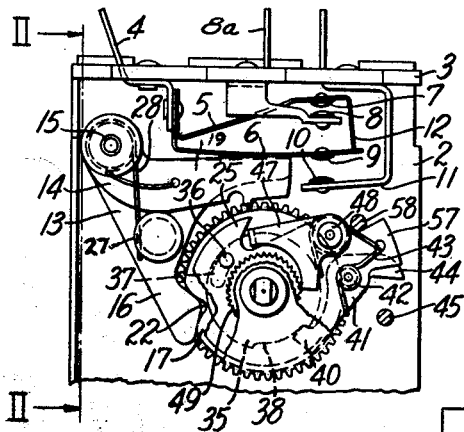

April 27, 1965 J. L. HARRIS 3,180,157
CONTROL DEVICE
Filed Sept. 19, 1960

Inventor
John L. Harris

United States Patent Office 3,180,157
Patented Apr. 27, 1965

3,180,157
CONTROL DEVICE
John L. Harris, 4753 N. Newhall, Milwaukee, Wis.
Filed Sept. 19, 1960, Ser. No. 56,736
18 Claims. (Cl. 74—3.52)

This invention relates to timing devices for controlling machinery, cooking equipment, sterilizers and appliances in general.

In commercial pressure cooking equipment it is desirable to provide a timer for shutting off the cooker and opening vent valves at the end of a predetermined time. It is also desirable to delay closing of the vent valves for a short time after the cooker is started. Prior to applicant's invention it was necessary to employ two separate timers. One timer would be manually set for the cooking time. The other timer was of the automatic reset type controlled by the manual timer. This second timer would start when the first timer was set. This would close the vent valves at the end of a predetermined time measured from the time the cooker was started by setting of the first timer.

The primary object of this invention is to provide a single timer for performing both functions, namely to provide a main timed period of adjustable length and a time delay period which starts from the setting of the timer, regardless of where it is set for the main timed period.

A further object of the invention is to provide a timer in which unrestricted movement of a setting member sets the timer for a predetermined timing.

Another object of the invention is to provide a timer in which the timing element is released from the timer motor at the end of the timed period, so that the timer motor can continue to run.

In the electric sterilizer field, it has been common to provide a timer for shutting off the sterilizer at the end of a predetermined time. Here, the object is to expose the objects to sterilizing temperature for a certain time. In order to do this, the user must guess how long it will take for the sterilizer to develop this sterilizing temperature and set the timer for a period which is the sum of the heating up time and the sterilizing time. This heating up time is a variable depending on how hot the sterilizer happens to be, room temperature, line voltage and the amount of the load.

Another object of this invention is to provide a timer which eliminates this guess work. More particularly, it is an object of the invention to provide a timer which can be set for a predetermined period, and in which energization of the timer motor is delayed until the heating up period is completed.

A further object of the invention is to provide a timer having a control element which is actuated by initial movement of the timer to a preset position, regardless of the location of such preset position.

Other objects will appear from the following description and appended claims.

Figure 2:
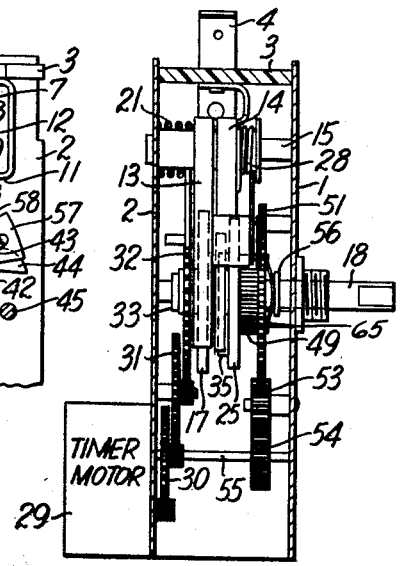
Figure 3:
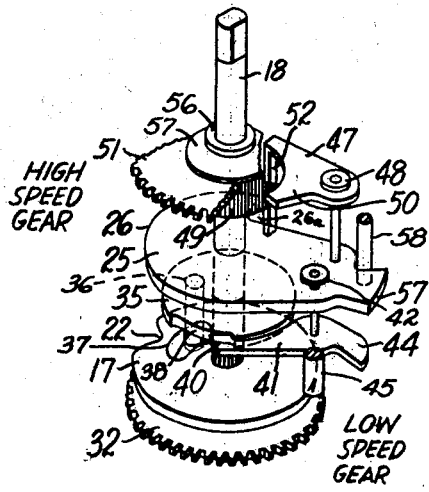
Figure 4:
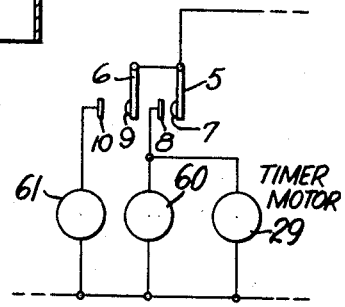
Figure 5:
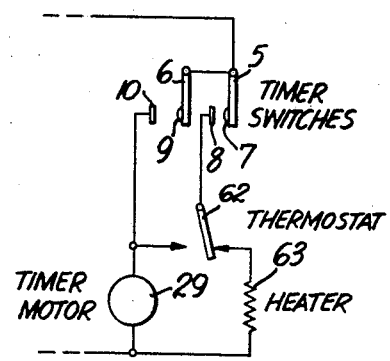

For a full disclosure of the invention reference is made to the accompanying drawings in which:

FIG. 1 is a fragmentary front view of a timer with the front removed to show the internal construction, FIG. 2 is an internal side view taken on line 2—2 of FIG. 1, FIG. 3 is an exploded view of the timer cam shaft assembly, FIG. 4 is a wiring diagram showing the application of the timer to a steam pressure cooker having vent valves, and FIG. 5 is a wiring diagram showing the timer applied to an electric sterilizer or cooker.

Referring to FIGS. 1 and 2, the timing mechanism is contained in a housing comprising a front plate 1 and a rear plate 2 which are spaced apart by suitable side members. Supported between plates 1 and 2 is a switch panel 3 which carries a switch blade bracket 4 which supports switch blades 5 and 6. The switch blade 5 carries a contact 7 which cooperates with a contact 8 which is carried on a contact bracket 8a which is secured to the terminal panel 3. The switch blade 6 carries a contact 9 which cooperates with a contact 10 carried by contact bracket 11 which is also secured to the panel 3. The switch blade 5 is provided with a down turned portion 12 which is engaged by the switch blade 6.

The switches 7–8 and 9–10 are shown in the open position. These switches are proportioned so as to open and close in sequence. Thus, when the switch blade 6 is lowered, contacts 7–8 will close at a point where contacts 9 and 10 are still open. Upon further downward movement of the switch blade 6, this blade will disengage from the down turned portion 12 of the switch blade 5 and engage contacts 9 and 10.

The switch blade 6 is actuated by a pair of cam followers 13 and 14 which are carried by a cam follower shaft 15 which is supported between the plates 1 and 2. The cam follower 13 is formed with two leg portions. One leg portion 16 rides a cam 17 which is carried by a cam shaft 18. This cam follower is also provided with a leg portion 19 which engages the switch blade 6. This cam follower 13 is provided with a torsion type biasing spring 21 which is located on the cam follower shaft 15. This torsion spring biases the cam follower 13 in a counterclockwise direction as seen in FIG. 1. The cam 17 on which the cam follower 13 rides is generally circular in shape, but is provided with a notch 22 into which the cam follower drops when the timer is in the off position. This movement is caused by the biasing spring 21 and causes the switch blade 6 to be raised for opening both switches 9–10 and 7–8.

The cam follower 14 is located forwardly of the cam follower 13 and rides a cam 25 which is also carried by the cam shaft 18. This cam 25 is formed with a generally circular portion 26 and a sharp drop-off section 26a (FIG. 3). It should be noted that with the parts in the off position as shown in FIG. 1 the cam follower 14 has been lifted completely off the cam 25. This is caused by a stud 27 which is carried by the cam follower 13 and which engages the cam follower 14. This stud 27 is located in a position where it engages and lifts the cam follower 14 off the cam 25 as the leg portion 16 of the cam follower 13 drops into the notch 22 of cam 17. Also the cam follower 14 is biased against the stud 27 by means of a torsion spring 28 which is carried by the cam follower shaft 15. One end of this torsion spring 28 bears against the stud 27 and the other portion extends into a hole in cam follower 14.

The cam shaft 18 is driven at low speed by a timer motor 29 through a gear train consisting of gears 30, 31 and 32. The gear 32 is carried on the cam shaft 18 and a friction clutch 33 as well known in the art is provided between this cam shaft and gear so that the cam shaft may be turned for setting the timer.

The cam shaft 18 carries a driver 35 which is located between the cams 17 and 25. This driver is provided with a pin 36 which extends into a slot 37 in the cam 17. This provides a lost motion drive between the shaft 18 and the cam 17. This lost motion connection provides for snap action of the cam follower 16 when it drops into notch 22 of cam 17. As shown more clearly in FIG. 3 the driver 35 is generally circular in shape and is provided with a notch 38. This notch 38 receives the lug shaped end 40 of a setting pawl 41 which is pivoted to the cam 25 at 42. This setting pawl is biased against the driver 35 by means of a torsion spring 43. This setting pawl is also formed with a section 44 which is arranged to engage a setting stop pin 45 which may be attached to either plate 1 or 2.

The cam 25 also carries a driving pawl 47 which is pivoted to the cam 25 at 48. This driving pawl has a portion 50 which engages a knurled driving drum 49 which is loosely carried by the cam shaft 18. This driving pawl 47 also has a portion 52 which extends into the cam 25 adjacent the drop off section 26a. This driving pawl is biased clockwise as seen in FIG. 1 so as to normally engage the driving drum 49. This driving drum 49 is driven by a high speed gear 51 which in turn is driven by an idler gear 53 and a pinion 54 which is carried by the shaft 55 which also carries the gear 30. The gear 30 and the pinion 54 are rigidly mounted on the shaft 55 so that the gear 53 is also driven by the timer motor 29. The driving drum 49 and the high speed gear 51 are carried on a hub 56 which is free to turn on the shaft 18. The hub 56 is pressed into the drum 49, while the gear 51 is free to turn on this hub. A spring washer 65 is provided to press the gear into engagement with the drum to provide a friction drive between the gear 51 and the drum 49 so that the drum 49 may be rotated during the setting operation of the timer without requiring rotation of the gear 51.

The cam 25 is formed with a portion 57 adjacent the points where the setting pawl 41 and drive pawl 47 are located. This portion 57 of the cam 25 is adapted to engage a stop pin 58 for limiting its motion in a counter-clockwise direction. This same portion 57 of the cam 25 also is adapted to engage the stop pin 45 for limiting the motion of this cam 25 in a clockwise direction.

OPERATION

It will be understood that the timer will be supplied with a suitable knob and a dial as is customary with manual preset timers. The parts in FIG. 1 are shown in the positions occupied when the timer is in the off position. At this time the cam follower 13 is in the notch 22 of cam 17. This has caused the switch blade 6 to be raised to the point where both sets of contacts are open. Also, the stud 27 carried by the cam follower 13 has raised the cam follower 14 off cam 25. At this time the drive pawl 47 is engaging the driving drum 49. Also the lug end 40 of the setting pawl 41 is located in the slot 38 of the driver 35. The cam 25 is also in its counter-clockwise limit of rotation and is engaging the stop pin 58.

When the timer is applied to a commercial pressure cooker the switches are wired as indicated in FIG. 4. To place the cooker in operation the operator will rotate the timer shaft 18 in a clockwise direction to a location giving the cooking time desired. The driver 35 is rigidly mounted on the time shaft 18 and the pin 36 carried by this driver causes rotation of the cam 17 by engaging the end of the slot 37 in this cam. This raises the cam follower portion 16 out of the notch 22 of cam 17 which causes the lowering of the leg portion 19 of the cam follower. This also permits downward movement of the cam follower 14 in attempting to follow the stud 27 on the cam follower 13. During the initial portion of this setting movement cam 25 is pulled in a clockwise direction by the setting pawl 41. This brings the cam 25 under the cam follower 14 and this cam follower 14 holds the blade 6 in an intermediate position in which contacts 9 and 10 are still open while contacts 7 and 8 have been permitted to close.

When the cam 25 reaches its predetermined setting the portion 44 of the setting pawl engages stop pin 45. This causes counter-clockwise rotation of the setting pawl relative to the cam and lifts the lug portion 40 of the setting pawl out of the notch 38 in the driver 35. After this point is reached the setting pawl rides the periphery of the driver 35 and thus the cam 25 remains in its predetermined position while the cam shaft 18 is being turned for setting the main timing as determined by cam 17. During this setting motion of the cam 25 the drive pawl 47 has been engaging the driving drum 49. At this time the driving drum turns relative to the high speed gear 51 due to the friction clutch between these two parts.

From the foregoing it will be seen that manual rotation of the cam shaft 18 in a clockwise direction sets the cam 17 for the main timing desired. It also sets the cam 25 to a position determined only by the location of the stop pin 45. This initial manual setting motion of the cam shaft 18 causes closing of the contacts 7 and 8. However, the contacts 9 and 10 are still disengaged. Referring to FIG. 4 it will be seen that this setting operation of the timer has energized the timer motor 29 and the main valve 60 of the pressure cooker due to closure of contacts 7 and 8. However, the vent valve 61 is still open due to contacts 9 and 10 being disengaged.

The timer motor is now energized and drives the cam shaft 18 in a counter-clockwise direction at slow speed through the slow speed gear 32. At this time the cam 25 is being driven counter-clockwise at a relative high speed due to the gear 51 turning the driving drum 49. Inasmuch as the drive pawl portion 50 is now engaging this driving drum the cam 25 is rotated counter-clockwise with a positive motion. Just before the cam 25 engages the stop pin 58, the cam follower 14 drops off this cam 25 at section 26a which permits closing of the contacts 9 and 10. This same drop-off motion of the cam follower 14 causes it to contact portion 52 and thus rotates the drive pawl 47 in a counterclockwise direction as seen in FIG. 1 and raises this pawl off the driving drum 49. The driving drum 49 is now free to turn without turning or attempting to turn the cam 25. Closure of the contacts 9 and 10 closes the vent valve of the pressure cooker and this unit is now in full operation.

The timer cam shaft 18 continues to rotate slowly in a counter-clockwise direction and at the end of the timed period brings the notch 22 of the cam 17 under the cam follower 13. Due to the lost motion drive provided by the pin 36 and the slot 37, the cam is free to move forwardly (counter-clockwise) relative to the cam shaft and thus provides a snap action movement of the cam follower 16 when it drops into the notch.

Just before the timer reaches the off position in which the cam follower 13 drops into notch 22 of the cam, the lug portion 40 of the setting pawl 41 drops into the notch 38 of the driver 35. This setting pawl is thus prepared to reset the cam 25 the next time that the timer is manually set. When the cam follower 13 drops into the notch 22 of cam 17 is lifts the blade 6 to the position shown in which both sets of contacts are open. Also, this cam follower 13 now lifts the cam follower 14 clear of the cam 25 so that the cam 25 can come under this follower when this timer is reset.

When the timer is used for controlling a sterilizer it is wired as shown in FIG. 5. In this case contacts 7 and 8 of the timer control the current to a thermostat 62 which is provided with a double throw switch and which controls the sterilizer heater 63. This thermostat is shown in the "cold" position. When the timer is set, contacts 7 and 8 of the timer close immediately. This energizes the heater 63 through the "cold" contacts of the thermostat. At this time contacts 9 and 10 of the timer are still open and thus the timer motor remains de-energized.

When the sterilizer comes up to temperature the thermostat de-energizes the heater 63 and closes a contact which energizes the timer motor 29. This timer motor, in a matter of seconds, closes contacts 9 and 10 of the timer which create a new circuit to the timer motor 29 which is independent of the thermostat. The timer now runs back to the off position as previously described. During this time the thermostat 62 is cycling back and forth to maintain the proper temperature in the sterilizer. However, it no longer has any effect on the timer motor as this motor is now running through an independent circuit closed by the timer.

From the foregoing it will be apparent that this invention provides a combination timer which can be used to time two separate periods or to provide a special control sequence for specific applications. While a preferred form of the invention has been shown it will be understood that many modifications may be made without departing from the spirit and scope of the invention. It is therefore desired to be limited only by the scope of the appended claims.

I claim:

1. In a timer mechanism, the combination of a cam, a control device actuated by said cam at a first predetermined position, means including a timer motor for driving said cam, a setting element, a clutch connecting the cam and setting elements, and means operated by said setting element for releasing said clutch when the cam is shifted by said setting element to a second predetermined position.

2. In a timer mechanism, the combination of a cam, a control device actuated by said cam at a first predetermined position, means including a timer motor for driving said cam, a setting element, a clutch connecting the cam and setting element, means operated by said setting element for releasing said clutch when the cam is shifted by said setting element to a second predetermined position, and means for re-engaging the clutch when the cam is in said first predetermined position.

3. In a timer mechanism, the combination of a cam, a control device actuated by said cam at a first predetermined position, means including a timer motor for driving said cam, a setting element, a clutch connecting the cam and setting element, means operated by said setting element for releasing said clutch when the cam is shifted by said setting element to a second predetermined position, and means for re-engaging the clutch when the setting element is returned to a predetermined position.

4. In a timer mechanism, the combination of a cam, a control device actuated by said cam at a first predetermined position, means including a timer motor for driving said cam, a setting element, a clutch connecting the cam and setting element, means for releasing said clutch when the cam is shifted to a second predetermined position and means for re-engaging the clutch only when the cam is returned to said first predetermined position and the setting element is returned to a corresponding predetermined position.

5. In a timer mechanism, the combination of, a cam, control device actuated by said cam at a first predetermined position, a timer motor, means including a motor clutch connecting the timer motor and cam whereby the cam is selectively driven or not driven by said timer motor, a setting element for setting said cam, a setting clutch connecting the cam and setting element, means for releasing the setting clutch when the cam is shifted to a second predetermined position, and means for releasing the motor clutch when the cam is returned to said first predetermined position.

6. In a timer mechanism, the combination of, a cam, a control device actuated by said cam at a first predetermined position, a timer motor, means including a motor clutch connecting the timer motor and cam whereby the cam is selectively driven or not driven by said timer motor, a setting element for setting said cam, a setting clutch connecting the cam and setting element, means for releasing the setting clutch when the cam is shifted to a second predetermined position, means for releasing the motor clutch when the cam returns to said first predetermined position, and means for engaging the setting clutch upon movement of the setting element to a predetermined position.

7. In a timer mechanism, the combination of, a cam, a cam follower riding said cam, a cam shaft loosely carrying said cam, a driver carried by said cam shaft and rotated thereby, a driving drum freely mounted on said cam shaft, a motor arranged to drive said driving drum, a drive pawl attached to said cam and engaging said driving drum, a setting pawl attached to the cam and engaging said driver, means for releasing the setting pawl from the driver when the cam is rotated to a predetermined position by said shaft, and means for releasing the drive pawl from the driving drum when the cam is rotated by said motor to a second predetermined position.

8. In a timer mechanism, the combination of, a cam, a cam follower riding said cam, a cam shaft loosely carrying said cam, a driver carried by the shaft and rotated thereby, a driving drum freely mounted on the cam shaft, a motor arranged to drive said driving drum, pawl means mounted on the cam for selectively engaging said driver or driving drum, means for actuating said pawl means to release from the driver when the cam is rotated thereby to one position, and means for actuating said pawl means to release from the driving drum when the cam is rotated by the timer motor to a second position.

9. In a timer mechanism, the combination of, a cam, a cam follower riding said cam, a cam shaft loosely carrying said cam, a driver carried by the shaft and rotated thereby, a driving drum freely mounted on the cam shaft, a motor arranged to drive said driving drum, pawl means mounted on the cam for selectively engaging said driver or driving drum, means for actuating said pawl means to release from the driver when the cam is rotated thereby to one position and means actuated by said cam follower for actuating said pawl means to release from the driving drum when the cam is rotated by the timer motor to a second position.

10. In a timer mechanism, the combination of, a cam, a cam follower, a control device actuated by the cam follower when the cam reaches a predetermined position, means including a timer motor for driving the cam, a clutch connecting the timer motor and cam, and means actuated by said cam follower for releasing said clutch after the cam reaches said predetermined position.

11. In a timer mechanism, the combination of a cam having a drop off section, a cam follower biased against said cam, a driving element adjacent said cam, a motor arranged to actuate said driving element, a pawl carried by said cam and having a portion engaging said driving element for causing movement of the cam by said driving element, said pawl also having a portion extending under the drop off section of the cam and arranged to be contacted by the cam follower dropping into said drop off section for disengaging the pawl from said driving element.

12. A timer mechanism including a cam shaft, means including a timer motor for driving said cam shaft, a cam on said shaft and rotated thereby, a first control device operated by said cam when the cam shaft is in a predetermined first position, means for setting said cam shaft to another position for determining the time to elapse before the first control device is actuated, a second cam carried by said cam shaft, a second control device operated by said second cam when it reaches a first predetermined position, means including means carried by said cam shaft for transmitting motion of said setting means for also moving said second cam to a second predetermined position when said cam shaft is set, and means operated by the motor for returning said second cam to its first predetermined position where it operates said second control device.

13. A timer mechanism including a cam shaft, means including a timer motor for driving said cam shaft at a relatively slow speed, a cam on said shaft and rotated thereby, a first control device operated by said cam when the cam shaft is in a predetermined first position, means for setting said cam shaft to another position for determining the time to elapse before the first control device is actuated, a second cam carried by said cam shaft, a second control device operated by said second cam when it reaches a first predetermined position, means including means carried by said cam shaft for transmitting motion of said setting means for also moving said second cam to a second predetermined position when said cam shaft is set, and means operated by said timer motor for returning said second cam to its first predetermined position where is operates said second control device, said last named means being arranged to drive the second cam at a relatively high speed as compared to the speed of said first cam.

14. A timer mechanism including a timer motor, a cam shaft, driven by said timer motor, a first cam carried by said cam shaft, manual means for setting said cam shaft, a second cam carried by said cam shaft, means for setting said second cam simultaneously with the first cam, said means including a pawl carried by second cam, a driver carried by the cam shaft for cooperating with said pawl for moving said second cam with said shaft, and means for releasing said pawl from the driver when the second cam reaches a predetermined position, whereby setting of the cam shaft sets the cams to two different positions.

15. A timer mechanism including a timer motor, a cam shaft driven by said timer motor, a first cam carried by said cam shaft, manual means for setting said cam shaft, a second cam carried by said cam shaft, a pawl carried by second cam, a driver carried by the cam shaft for cooperating with said pawl for moving said second cam with said shaft, a cam follower controlled by said second cam, drive means including a clutch between said second cam and said timer motor, and means actuated by said cam follower for controlling said clutch.

16. In a timer mechanism, the combination of cam means, a control device actuated by said cam means at a first predetermined position, means including a timer motor for driving said cam means in one direction, a setting element for driving said cam means in the opposite direction from said predetermined position, a clutch connecting the cam means and said setting element, means for releasing said clutch when the cam means is shifted by said setting element to a second predetermined position, and means for retaining said clutch in released position so that the timing motor may drive the cam means in said first direction independently of said setting element.

17. A device as defined in claim 16 including automatic means for re-engaging the clutch when the cam means is returned to said first pre-determined position.

18. A device as defined in claim 16 including automatic means for re-engaging the clutch when the setting element is returned to a predetermined position.

References Cited by the Examiner
UNITED STATES PATENTS

| | | | |
|---|---|---|---|
| 1,952,763 | 3/34 | Lux | 74—3.54 |
| 1,979,293 | 11/34 | Smith | 74—3.52 |
| 2,724,322 | 11/55 | Parr | 74—3.54 |
| 2,878,748 | 3/59 | Stanek | 74—3.54 |
| 2,940,317 | 6/60 | Goodhouse | 74—3.52 |

BROUGHTON G. DURHAM, *Primary Examiner.*
DON A. WAITE, *Examiner.*